United States Patent [19]

Raymont, Jr.

[11] Patent Number: 4,702,105
[45] Date of Patent: Oct. 27, 1987

[54] SNUBBERS AND METHODS AND APPARATUS FOR THE IN-PLACE TESTING THEREOF

[75] Inventor: John M. Raymont, Jr., Costa Mesa, Calif.

[73] Assignee: Paul-Munroe Hydraulics, Inc., Orange, Calif.

[21] Appl. No.: 845,200

[22] Filed: Mar. 28, 1986

[51] Int. Cl.⁴ .......................................... G01M 19/00
[52] U.S. Cl. .......................................... 73/168; 73/11; 188/313; 376/245
[58] Field of Search ............... 73/11, 168; 376/234, 376/285, 327, 245; 188/313, 318, 322.13, 322.21, 1.11; 267/64.28

[56] References Cited

U.S. PATENT DOCUMENTS

| | | | |
|---|---|---|---|
| 2,812,954 | 11/1957 | Lyon | 267/64.28 |
| 3,098,382 | 7/1963 | Hoffman et al. | 73/168 |
| 3,771,499 | 11/1973 | Marron, Jr. et al. | 376/285 |
| 4,131,010 | 12/1978 | Eyres | 73/11 |
| 4,192,173 | 3/1980 | Ay et al. | 73/11 |
| 4,202,209 | 5/1980 | Holmes | 73/11 |
| 4,314,473 | 2/1982 | Sulzer | 73/11 |
| 4,384,591 | 5/1983 | Tan | 73/11 |
| 4,423,664 | 1/1984 | Buchl | 73/168 |
| 4,429,563 | 2/1984 | Sulzer | 73/11 |
| 4,550,589 | 11/1985 | Wright, Jr. | 73/11 |

Primary Examiner—Charles Frankfort
Assistant Examiner—Thomas B. Will
Attorney, Agent, or Firm—Blakely, Sokoloff, Taylor & Zafman

[57] ABSTRACT

Snubbers and methods and apparatus for the in-place testing thereof are disclosed. The snubbers include a manifold between the hydraulic cylinder and each of the two control valves fastened thereto whereby for test purposes the control valves and hydraulic cylinder may be isolated from each other and coupled to a test machine for the independent testing thereof. Isolation of the control valves from the hydraulic cylinder allows separate testing of the control valves for lockup and bleed, and isolation of the hydraulic cylinder allows the testing of the cylinder for leakage and breakaway. Various embodiments are disclosed.

13 Claims, 12 Drawing Figures

SNUBBERS AND METHODS AND APPARATUS FOR THE IN-PLACE TESTING THEREOF

BACKGROUND OF THE INVENTION

1. Field of the Invention

This invention relates to the field of snubbers such as used in the nuclear power industry, and more particularly to methods and apparatus for in-place testing of such snubbers.

2. Prior Art

In the United States at the present time, the approximately 130 nuclear power plants operating or under construction utilize hydraulic and mechanical snubbers as a means of providing on-demand rigid struts to protect equipment and piping from potential seismic and accident transients while allowing for free movement of the piping and equipment during thermal expansion. Hydraulic snubbers are generally in the form of a hydraulic cylinder and piston assembly, with the cylinder being attached to a reaction wall or other support structure and the piston rod being attached to the equipment to be protected. The two chambers on the opposite sides of the piston are in communication with each other through control valves which remain open under normal conditions to allow the position of the piston within the cylinder to freely drift in accordance with the differential expansion encountered, but which valves effectively close or restrict under more dynamic conditions to relatively rigidly couple the equipment to the support structure. This rigid coupling eliminates devastating vibrations and resonances. Snubbers of this general type are manufactured by Paul-Munroe Hydraulics Inc., assignee of the present invention.

Snubber sizes range from providing resistance loads of as little as several hundred pounds to in excess of two million pounds. The corresponding weight of the larger units are in the one to one and one-half ton range. The snubbers in Boiling Water Reactor plants (approximately 40 BWRs operating or under construction in the U.S.) generally do not exceed 150,000 pounds in capacity as opposed to the Pressurized Water Reactor plants (approximately 90 PWRs operating or under construction in the U.S.) utilizing up to the largest snubbers for protection of their reactor coolant pumps and steam generators.

In 1980 and again in 1981, the U.S. Nuclear Regulatory Commission issued generic letters to the nuclear power industry requesting performance of routine in-service inspection on their snubbers. This was to ensure that the snubbers, which perform a safety related function in the power plants, were in good repair. This requirement by the NRC has caused the nuclear power industry to seek cost effective means of testing snubbers.

Until approximately three years ago, the only method available to the nuclear power industry for in-service inspection testing was with a test bench. A test bench tests the snubber directly by applying an external load to the snubber causing movement of the snubber piston which results in pressurization of the unit. This application of an external load tests the snubber in a manner analogous to its installed condition. While the test bench is a proven and reliable technology it requires the unit to be removed from the plant for testing. This is extremely expensive in terms of removal and reinstallation costs, outage costs, radiation exposure costs, snubber decontamination costs and testing costs. In some cases it is not possible to remove the snubbers without cutting out piping and concrete or removing equipment.

In an attempt to find a solution to the problem of removing the snubber, test machines were developed in the last three years to allow testing of the snubbers in a partially installed condition. Although termed in-place testing, this in fact is a misnomer because removal of the rod end pin is required to perform the test. The in-place test is an indirect test of the snubber because the unit is pressurized by introducing snubber hydraulic fluid through fill and bleed plugs (26 and 27 in FIGS. 1 and 11) to initiate movement of the rod which simulates external loading.

The snubber is tested for the same four tests as with the test bench: lockup and bleed tests to verify the performance of the control valves, and breakaway and drag to verify the performance of the seals. Current in-place testing techniques require performance of the breakaway and drag tests while the rod is being stroked, with the lockup and bleed tests being performed with the rod either fully extended or retracted.

Although there are some reduced radiation exposure, removal and reinstallation, outage, decontamination, and testing costs, these costs still remain relatively high, primarily because of the pin removal requirement. In fact in approximately 80% of the cases, even with the rod end pin removed, the test cannot be performed because the rod end pivot cannot clear the supporting equipment. In these cases the snubber still has to be removed and tested on a test bench. Because of the problems associated with the partially installed configuration, existing in-place test technology has not provided the solution that the nuclear industry has been seeking.

BRIEF SUMMARY OF THE INVENTION

Snubbers and methods and apparatus for the in-place testing thereof are disclosed. The snubbers include a manifold between the hydraulic cylinder and each of the two control valves fastened thereto whereby for test purposes the control valves and hydraulic cylinder may be isolated from each other and coupled to a test machine for the independent testing thereof. Isolation of the control valves from the hydraulic cylinder allows separate testing of the control valves for lockup and bleed, and isolation of the hydraulic cylinder allows the testing of the cylinder for performance of the seals. Various embodiments are disclosed.

DETAILED DESCRIPTION OF THE INVENTION

Figure 1:
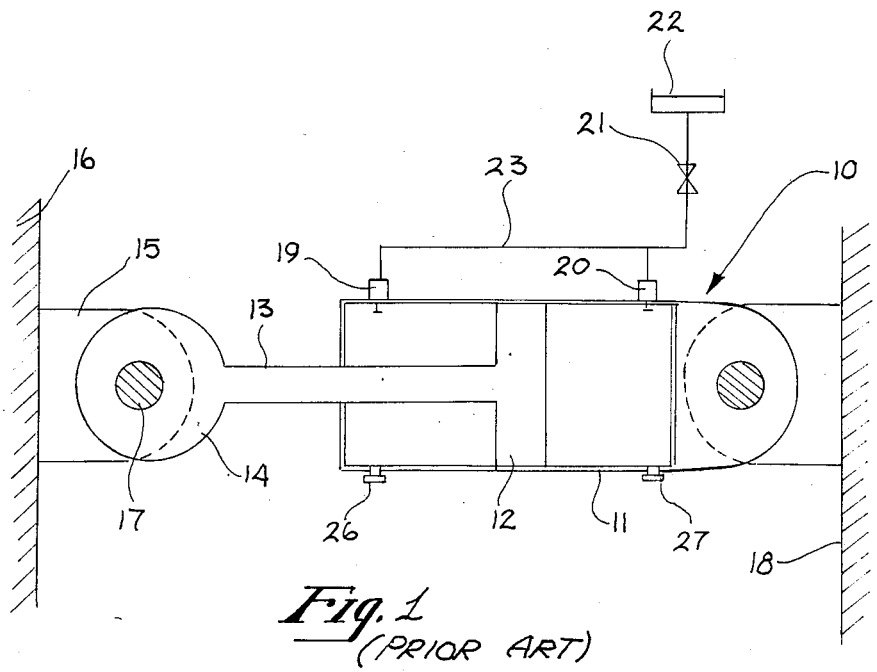
FIG. 1 is a side view of a Paul-Munroe prior art snubber.
Figure 11:
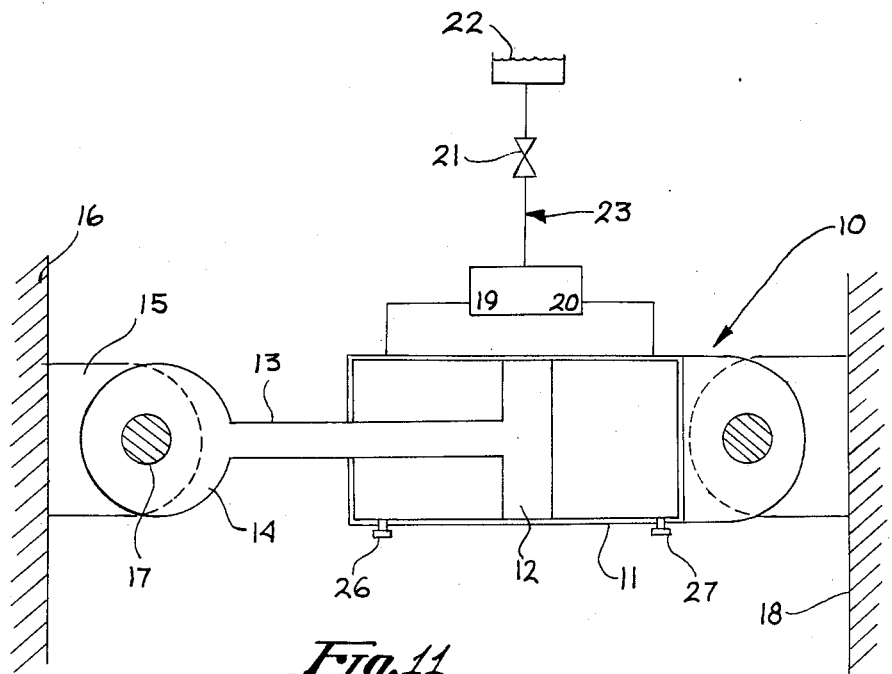
FIG. 11 is a side view of a non-Paul-Munroe prior art snubber.

First referring to FIG. 1 and FIG. 11, a diagram illustrating a typical prior art snubber installation may be seen. The snubber, generally indicated by the numeral 10, is comprised of a hydraulic cylinder 11 having a piston 12 therein connected to a piston rod 13. The piston rod 13 in turn is coupled to the equipment 16 to be protected through a clevis arrangement comprising a clevis pin 17, coupling member 14 on the piston rod 13, and member 15 connected to the equipment to be protected. A similar clevis arrangement is also illustrated as coupling cylinder 11 to a fixed structure such as reaction wall 18.

Located on cylinder 11 on opposite sides of the piston 12 are control valves 19 and 20 coupled to each other through line 23 and to a reservoir 22 of hydraulic fluid. In normal use the valve 21 is open and the cylinder 11 is filled with hydraulic fluid on both sides of piston 12. The reservoir of course assures an adequate supply of hydraulic fluid in spite of expansion and contraction thereof, etc., and of course provides temporary storage of the hydraulic fluid in the cylinder 11 displaced by the piston rod 13 as the piston 12 moves to the right, utilizing the relative orientations of FIG. 1.

In a typical snubber, the control valves 19 and 20 are poppet valves which effectively provide nonlinear characteristics of the snubber. In particular, in normal operation wherein piston speeds due to normal expansion will be relatively low, the poppet valves are open, allowing relatively free exchange of hydraulic fluid between the opposite sides of the piston and with the reservoir so that there is no substantial hydraulic resistance to the free movement of the piston as a result of such expansion and contraction. However, if the piston speed exceeds a predetermined velocity as indicated by the flow of hydraulic fluid out of the respective chamber of cylinder 11, as during a seismic or other extraordinary event, the poppet valve coupled to the cylinder chamber from which the hydraulic fluid is flowing will close, now highly restricting the flow therefrom as determined by a relatively small bleed restriction in the valve. The other poppet valve allowing hydraulic fluid into the opposite chamber of the cylinder will remain open to assure that the respective chamber will fill at whatever rate is required, as opposed to merely drawing a vacuum, whereby the functions of the two valves may reverse when the piston motion reverses, thereby making the snubber substantially rigid during such extraordinary events.

As mentioned in the prior art section, the tests of snubbers generally desired include lockup and bleed tests to verify the performance of the control valve, and breakaway and drag tests to verify the performance of the piston and piston rod seals. In particular, the lockup tests are intended to verify that the control valves will close at the desired piston speed, with the bleed test verifying the desired relatively low bleed rate through the control valves when closed. These tests are important of course, as failure of the control valves to close will result in failure of the snubber to provide the substantial rigid support upon the occurrence of an extraordinary event, whereas an inadequate bleed rate may cause overstressing of the equipment the snubber was intended to protect by not providing a controlled release of the load during an extraordinary event, and more importantly, may cause the snubber to remain locked up during an extraordinary event and for some period thereafter so as to not be able to accommodate subsequent expansions or contractions. The breakaway and drag tests on the other hand assure that the seals are in their proper place and have not deteriorated to the point of sticking, that the piston seal does not have excessive leakage and that there is no other seizure in the system, thereby assuring that the snubber is not unnecessarily loading the equipment to be protected during normal operation thereof which could result in instant or fatigue failures, and that the piston leakage will not effect proper operation of the snubber during extraordinary occurrences.

Figure 2:
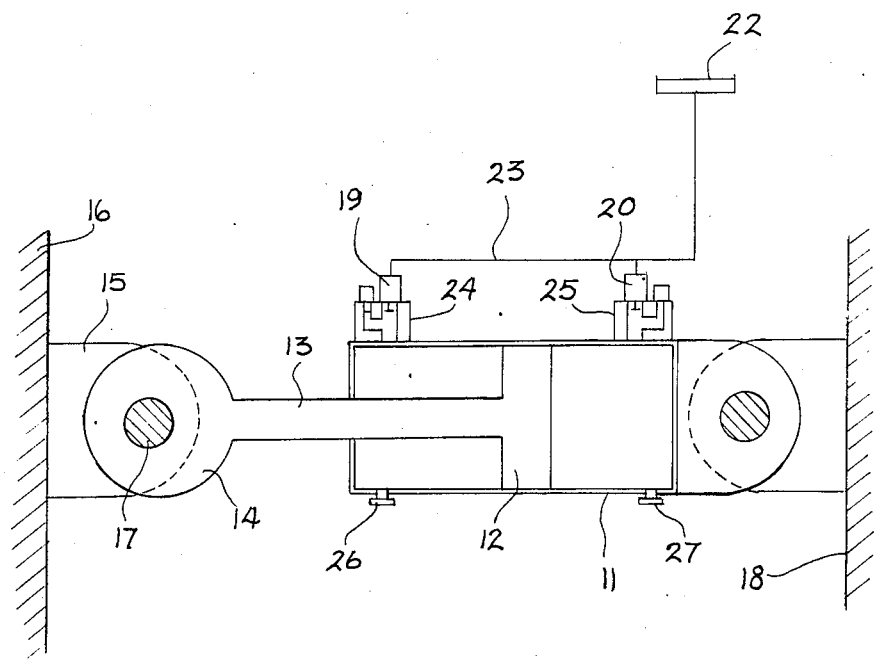
FIG. 2 is a side view of a Paul-Munroe snubber in accordance with the present invention.
Figure 12:
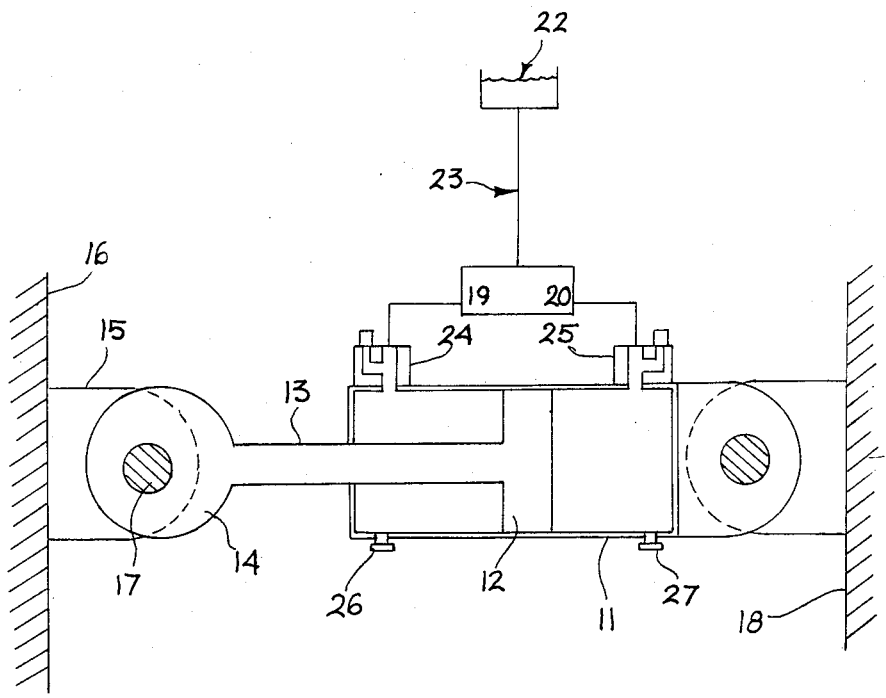
FIG. 12 is a side view of a non-Paul-Munroe snubber in accordance with the present invention.

Now referring to FIG. 2 and FIG. 12, a diagram similar to FIG. 1 but illustrating the addition of the manifolds 24 an 25 in accordance with the present invention may be seen. As shown, each of the manifolds 24 and 25 is positioned between a respective one of control valves 19 and 20 and cylinder 11. In general, while snubber designs vary, a typical design will utilize control valves which are threaded into or tubed into the hydraulic cylinder as opposed to being integral therewith. Accordingly, while the specific design of the manifolds 24 and 25 will vary dependent upon the specific snubber design, such manifolds may be readily designed and installed in existing equipment without normally requiring any modification, or at least any substantial modification of the cylinder and/or control valves. Implementation of the present invention into a non-Paul Munroe Snubber may take the alternative form of redesigning the existing control valve block to directly incorporate the design features of the invention.

Figure 3:
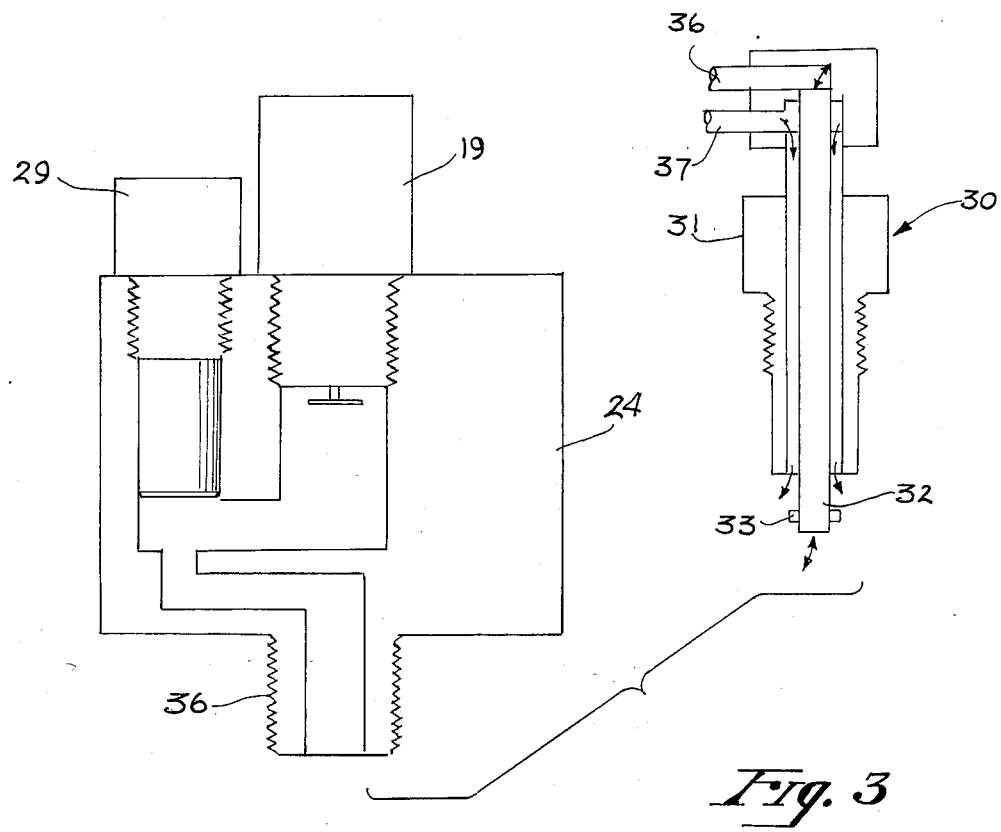
FIG. 3 is an expanded side view of one embodiment of the manifold of the present invention and a test cartridge used with that embodiment.

In the snubbers manufactured by Paul-Munroe, the assignee of the present invention, the control valves merely screw into the wall of cylinder 11. As such, the manifolds may be provided with corresponding male and female threaded regions so as to go into the cylinder in the place of the control valve and to receive the control valve thereon. This is illustrated in FIG. 3 wherein the body of a typical manifold, such as manifold 24, is provided with a female threaded region to receive control valve 19 and a corresponding male threaded region 36 for threading into the cylinder 11 (see FIGS. 1 and 2). The manifold 24, aside from providing direct fluid communication therethrough to the control valve 19 so as to not affect the operation thereof, further has a second port closed or capped off by a seal plug 29. Accordingly, the permanent presence of the manifolds 24 and 25 in a typical installation such as that illustrated in FIG. 2 have no effect on the normal operation thereof. However, the manifolds allow various tests to be performed on the snubber while in place, thereby allowing periodic testing without incurring the expense and downtime of removal, decontamination, etc.

Figure 4:
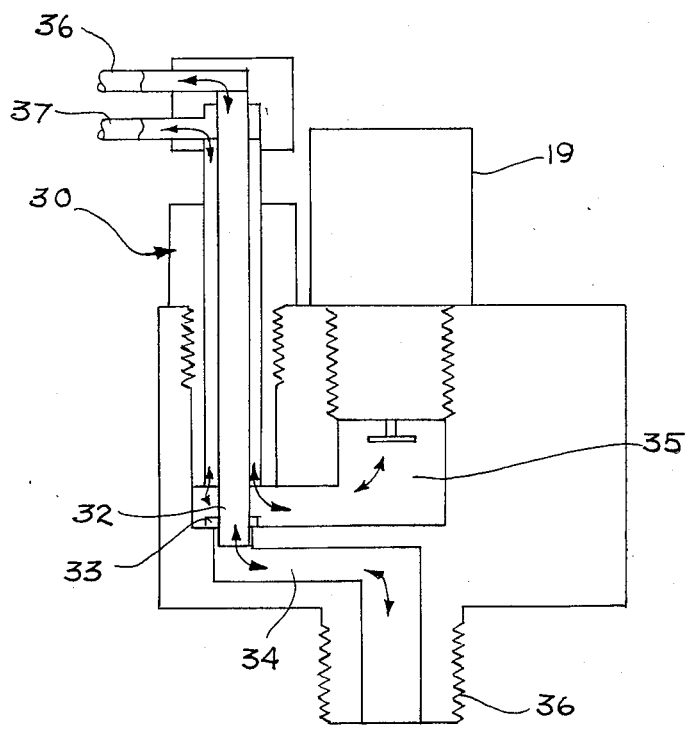
FIG. 4 is a side view of the embodiment of the manifold of FIG. 3 with the test cartridge installed.

For this purpose a test cartridge, generally indicated by the numeral 30 (see FIGS. 3 and 4), is provided. The test cartridge includes a cartridge body 31 which may be threaded into manifold 24 in place of the seal plug 29, as illustrated in FIG. 4. Mounted to the body 31 is a central tube 32 having a seal 33 at the lower end thereof for sealing region 34 in communication with the hydraulic cylinder from region 35 in communication with the control valve 19 (or 20). Obviously seal 33 is only shown schematically, though it will be obvious to those experienced in hydraulics that various types of seals are readily available and suitable for the purpose as desired, whether for sealing on a face surface, a diameter or other suitable sealing surface.

The test cartridge includes a pair of lines 36 and 37, line 36 being in fluid communication through the center of tube 32 so as to be in communication with the respective chamber of the cylinder, and line 37 being coupled to a port or opening between body 31 of the test cartridge and tube 32 supported thereby so as to be in fluid communication with chamber 35 and the control valve 19 (or 20) coupled thereto. Thus the net effect of the test cartridge in conjunction with the manifold is that the test cartridge essentially isolates the control valve from the cylinder, allowing fluid communication through the control valve separate and apart from the cylinder, and fluid communication with the cylinder separate and apart from the control valve. This allows various tests to be performed on both the snubber and the control valves as described below.

Figure 10:
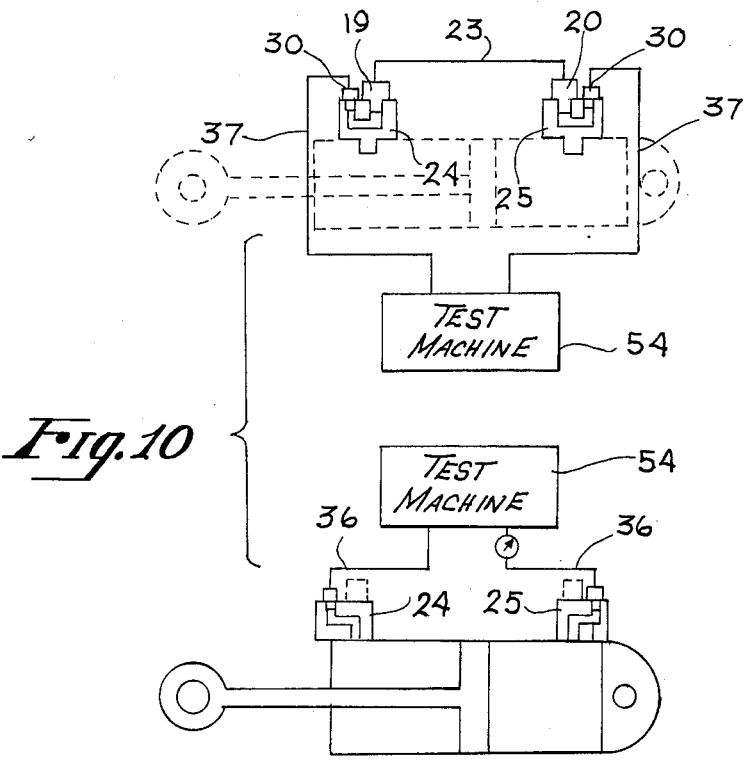
FIG. 10 is a diagram illustrating the testing configurations when utilizing the present invention.

The testing itself is perhaps best described with reference to FIG. 10, which is a schematic illustration of the essential aspects of the test setup for the control valves and for the cylinder seal tests. In particular, a test machine 54 is provided, which test machine includes a hydraulic reservoir, pumps, pressure gauges and flow controls to allow the measurement and control of various flow rates and pressures. For testing of course a test cartridge 30 is placed in each of manifolds 19 and 20 so that a total of four connections would be generally made to the test machine. For testing of the control valves only two of the four lines, specifically lines 37 as illustrated in the upper part of FIG. 10, are used for controlling the flow of fluid from the test machine through one of lines 37. With this arrangement, the characteristics of the respective one of control valves 19 and 20, including lockup and bleed, may be readily tested for, the other control valve normally being open for flow in that direction. Similarly, by repeating the procedure for the reverse flow direction, the other control valve may be similarly tested. Also, these tests may be conducted at any background pressure or pressures desired. In general, in the case of snubbers which are installed in regions subject to contamination, the lines coupling the test machine to the manifolds may be of sufficient length so that the test machine itself and the operator or operators thereof need not enter the contaminated area except for very short periods for connection to the manifolds, thereby avoiding any decontamination expense for the test machine and minimizing the expenses associated with conducting work in contaminated regions.

For conducting tests of the piston seals, lines 36 are used as illustrated in the lower portion of FIG. 10. Here various possibilities exist depending upon the snubber design and for that matter, the ultimate NRC requirements. In particular, the snubbers manufactured by Paul-Munroe utilize sel activating seals wherein the sealing pressures are approximately proportional to the differential pressure across the seal. For seals of this type (approximately 50% of the equipment snubbe market), the leakage potential is the greatest for low differential pressures across the seal. Accordingly, it is possible to also conduct the piston seal test with the snubber fully in place, as the seals may be adequately tested at sufficiently low differential pressures so as to not generate excessive forces on the equipment connected thereto. Further, in terms of seal material deterioration in the presence of the hydraulic fluid and radiation, one can readily take additional seals from the same production batch as the seals used on the piston and store these seals in hydraulic fluid under similar conditions so that the condition of these seals in terms of chemical composition and deterioration with time, temperature, hydraulic fluid, radiation, etc., will be indicative of the corresponding condition of the seals within the operative snubber. If the test seals demonstrate that no significant deterioration has occurred, then it may be extrapolated that the snubber seals would continue to exhibit the same performance as when originally tested for breakaway and drag at manufacture. Thus in this manner, complete in-place testing of the snubbers may be accomplished on a periodic basis with a relative minimum of equipment and with no removal or disconnection of the snubber with all of its attendant costs being required In snubbers of certain designs, the piston seals are not self-actuating, in which case seal leakage may tend to increase with increased differential pressures across the piston of the snubber. Accordingly, such equipment may require periodic high pressure testing, in which case the "in place" testing of the snubber will require removal of the piston rod and to allow the movement of the piston to extreme positions whereat the required differential pressure may be imposed across the piston seal. Of course, these snubbers could be retrofitted with self activating seals which would allow them to realize the full benefits of true in-place testing.

Having now described one embodiment of the present invention, it will be apparent that the manifolds 24 and 25 of FIG. 2 may have any of various configurations, as can the test cartridge so long as the combination allows the temporary isolation of the control valves from the snubber. This is illustrated in various alternate embodiments as shown in FIGS. 5 through 9. In particular, in FIG. 5, the manifold body 38 is similar to that shown in FIG. 3, though the test cartridge, generally indicated by the numeral 39 connects through the side thereof rather than through the top of the manifold, as in the earlier described embodiment. In the embodiment of FIG. 6, the test cartridge 40 also connects to the side of the manifold 41, though in a manner which effectively maintains the hydraulic lines 36a and 37a as separate lines or tubes within the manifold rather than utilizing a form of tube within a tube configuration as in the embodiments of FIGS. 3 through 5.

Figure 7:
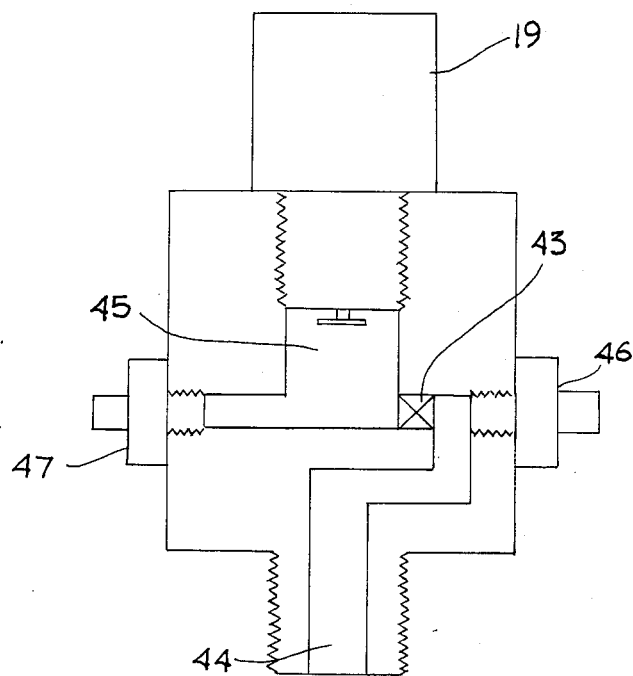
Figure 8:
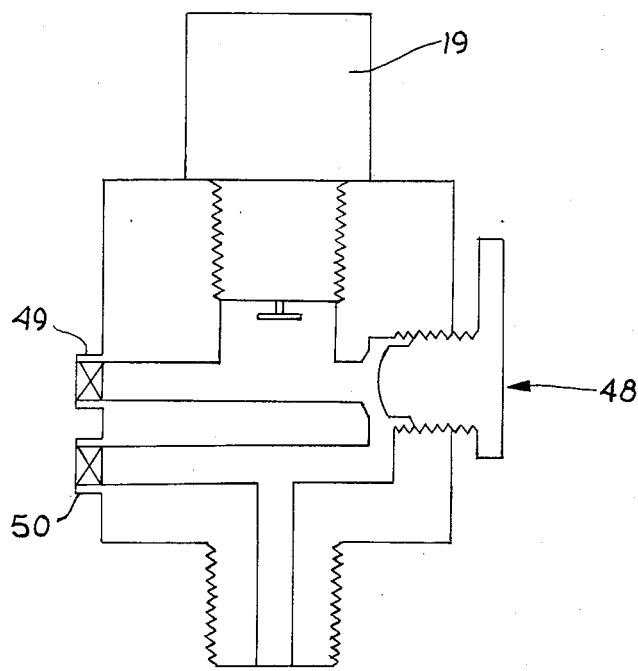

With respect to the embodiment of FIG. 7, this embodiment of course is functionally the same as the earlier described embodiments. However, it illustrates certain additional features which again may be incorporated in many other embodiments and configurations. In particular, a valve schematically illustrated as valve 43 in FIG. 7, is incorporated as a permanent part of the manifold so that the valve may be used to controllably isolate and connect the respective cylinder volume and control valve. In addition, permanent connections are made to communicate with regions 44 and 45 by way of quick disconnect couplings 46 and 47 respectively. Such an arrangement allows connection of the test machine to the manifolds in an absolute minimum of time and with an absolute minimum of opportunity for fluid leakage. Obviously, if desired, the quick disconnects could readily be directed upward rather than to the side, which may have advantages in terms of minimizing all opportunity for introducing air into the hydraulic system. The system of FIG. 8, on the other hand, illustrates a variation of that of FIG. 7 wherein the valve, generally indicated by the numeral 48, cooperates with a valve seat in the body of the manifold, with a pair of quick disconnects 49 and 50 provided at the opposite side of the manifold for connection thereto.

Figure 5:
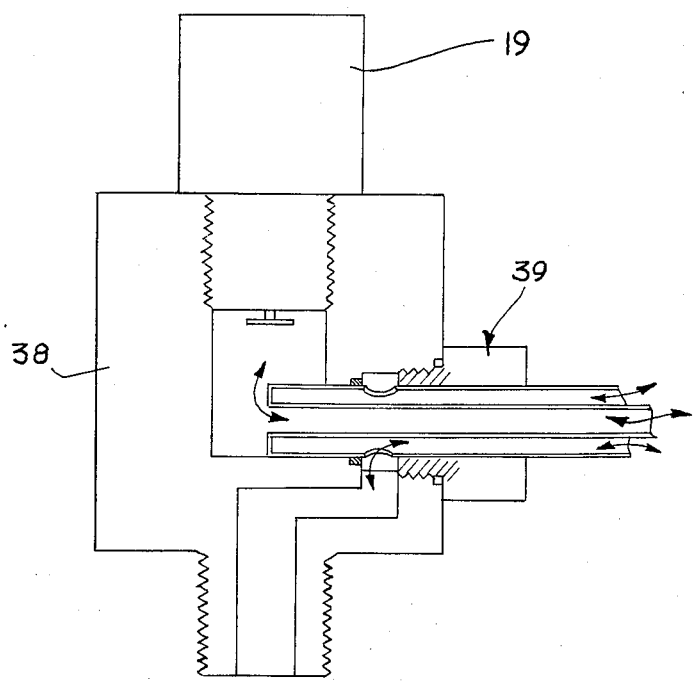
FIGS. 5 through 9 are side views of further alternate embodiments of the present invention.
Figure 6:
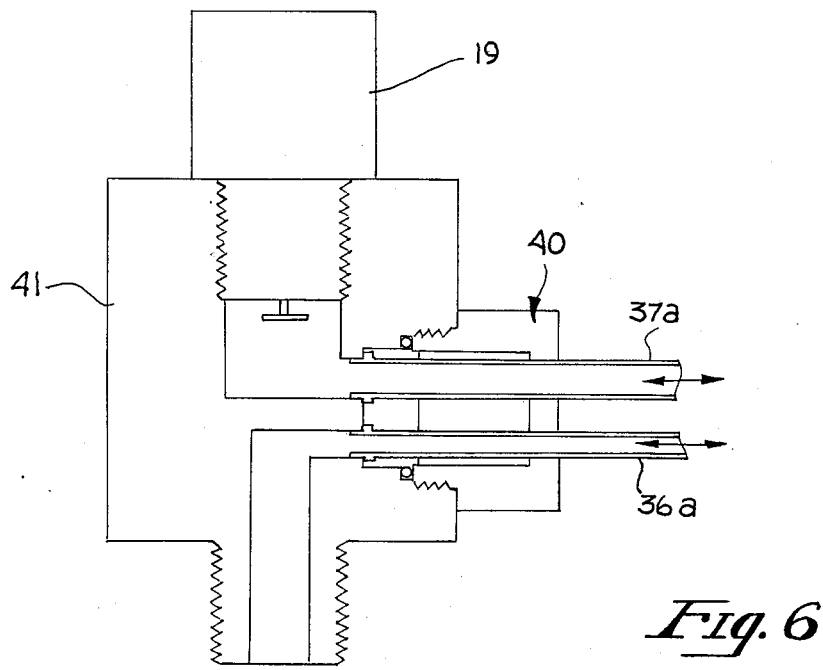
Figure 9:
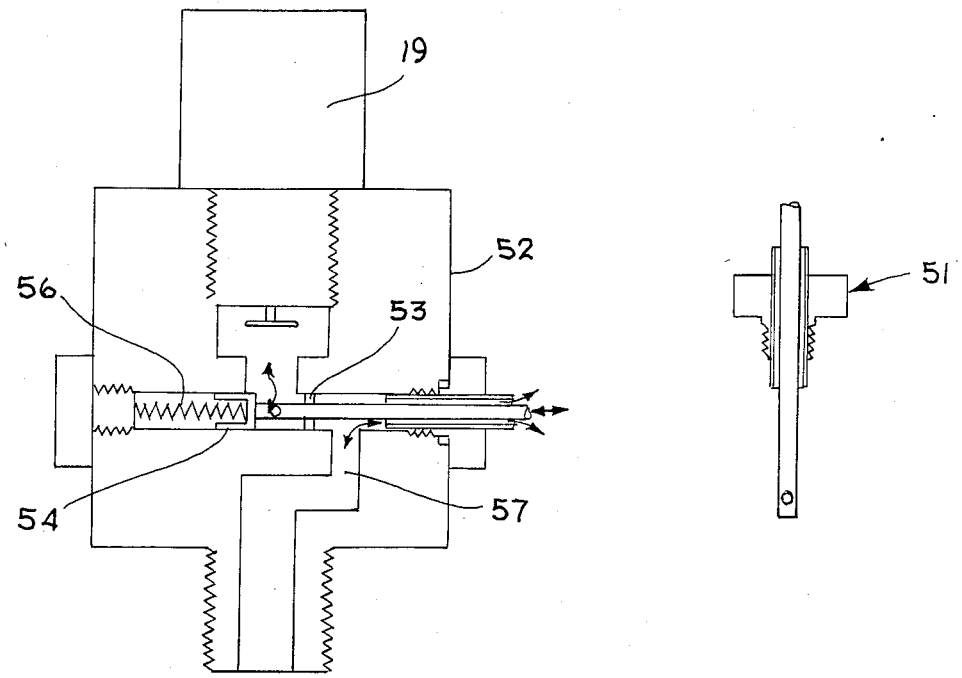

Finally in FIG. 9, an embodiment similar to that of FIG. 5 is shown. As with the embodiment of FIG. 5, a test cartridge generally indicated by the numeral 51 is insertable through the side of the manifold 52, with seal 53 providing the seal between the two chambers in the manifold. In this embodiment however, a sliding seal member 54 provided with spring 56 is positioned to cause the seal 54 to follow the test cartridge as it is being removed (or installed) so that upon removal of the test cartridge, seal 54 will take a position to the right of opening 57 in the manifold so as to not affect communication between the cylinder and the control valve, but to prevent leakage through the port occupied by the test cartridge until the seal cap is attached thereto.

Thus there has been disclosed and described herein snubbers which include test manifolds to allow the in-place testing thereof, together with methods and apparatus for carrying out such tests. While the invention has been disclosed and described with respect to certain preferred embodiments thereof, it will be understood by those skilled in the art that various changes in form and detail may be made therein without departing from the spirit and scope thereof.

I claim:

1. A device for coupling to and protecting a moveable object from shock, said device comprising
    a cylinder having first and second ends, said cylinder containing hydraulic fluid,
    a piston disposed within said cylinder, said piston moveable between said first and second ends and having a piston rod coupled to said piston and extending out of said cylinder,
    a seal coupled to said piston and disposed between said piston and said cylinder, said seal for preventing the flow of said hydraulic fluid around said piston,
    a first manifold having first and second ports in fluid communication with each other, the first port being coupled to said cylinder adjacent said first end for fluid communication therewith,
    a second manifold having first and second ports in fluid communication with each other, the first port being coupled to said cylinder adjacent said second end for fluid communication therewith,
    control valves coupled to each of said second ports of said first and second manifolds and to each other, said control valves permitting the flow of hydraulic fluid external to said cylinder from said first end to said second end, and from said second end to said first end responsive to movement of said piston, said manifolds each having means for isolating said first and second ports thereof from each other and for coupling to a test machine for independent fluid communication with said first and second ports of the respective manifold,
    whereby said seal can be tested in isolation from said control valves and said control valves can be tested in isolation from said seal while said device is in place.

2. The device of claim 1 wherein said means for isolating said first and second ports comprises a test cartridge for isolating said first port from said second port when mounted in said manifold.

3. The device of claim 2 wherein said cartridge includes a plurality of fittings, one of said fittings for communicating with a respective said control valve, another of said fittings for communicating with the respective end of said cylinder.

4. The device of claim 1 wherein said means for isolating said first and second ports comprises a valve integral with said manifolds for isolating said first port from said second port.

5. A snubber comprising
    a hydraulic cylinder having a piston slideable therein and sealed with respect thereto by a piston seal, said hydraulic cylinder having first and second cylinder chambers on opposite sides of said piston filled with hydraulic fluid,
    fluid communication means coupled to said first and second cylinder chambers for hydraulic fluid communication therebetween,
    said fluid communication means being coupled through control valve means, said control valve means being a means for controlling hydraulic fluid flow therethrough responsive to the movement of said piston in said cylinder,
    isolation means within said fluid communication means for controllably blocking fluid communication between said first and second cylinder chambers and said control valve means,
    first coupling means connected to said fluid communication means at each side of said control valve means, said first coupling means being a means for coupling to a test machine to controllably provide fluid flow through said valve means and not into either of said first and second cylinder chambers when blocked by said isolation means, and
    second coupling means coupled to said first and second cylinder chambers, said second coupling means being a means for coupling to a test machine to controllably provide fluid flow into and out of said first and second cylinder chambers and not through said valve means when blocked by said isolation means, whereby said piston seal can be tested in isolation from said control valve means, and said control valve means can be tested in isolation from said piston seal while said snubber is in place.

6. An improvement in a hydraulic snubber having a piston disposed in a cylinder having first and second ends containing hydraulic fluid, a seal disposed between said cylinder and said piston and control valves coupled to respective first and second ends of said cylinder and to each other for allowing flow of said fluid from one end to the other end during movement of said piston, said improvement comprising
    a manifold disposed between each of said control valves and said cylinder, isolation means for controllably preventing the flow of said hydraulic fluid between said cylinder and said control valves, and means for coupling to each manifold for independent fluid communication with said cylinder and said control valves,
    whereby said control valves can be tested in isolation from said seal and said seal can be tested in isolation from said control valves while said snubber is in place.

7. The device of claim 6 wherein each of said manifolds has a first opening for removably mounting said control valve, a second opening for accessing the hydraulic fluid in said cylinder and a third opening for removably mounting said isolation means.

8. The device of claim 7 wherein said isolation means comprises a test cartridge, and said cartridge isolates said first opening from said second opening when mounted in said manifold.

9. The device of claim 7 wherein said cartridge includes a plurality of fittings, one of said fittings for accessing said control valve, another of said fittings for accessing said cylinder.

10. The device of claim 7 wherein said isolation means comprises a valve for isolating said first opening from said second opening.

11. A method of in-place testing of a hydraulic snubber having a cylinder having first and second ends containing hydraulic fluid, a moveable piston disposed in said cylinder, a seal coupled to said piston and disposed between said piston and said cylinder, a rod coupled to said piston and to a protected object, control valves coupled to respective first and second ends of said cylinder and to each other and responsive to fluid flow therethrough, said method comprising the steps of (a) providing a permanent manifold disposed between each of said control valves and said cylinder, said manifold having a first opening for mounting said control valve, a second opening for accessing said cylinder, and normally allowing fluid flow therebetween, each manifold also having a first connection for fluid communication with said first opening and a second connection for fluid communication with said second opening, the first and second connection normally being blocked against fluid flow therethrough, (b) blocking each said manifold to prevent fluid flow between said first opening and said second opening, (c) unblocking said first and second connections and coupling said first and second connections of each manifold to a test machine for the controllable delivery of fluid to and from said connections, (d) testing said control valves by controlled fluid flow through said first connection in fluid isolation of said cylinder, and (e) testing said cylinder by controlled fluid flow through said second connection in fluid isolation of said control valves.

12. The method of claim 11 wherein step (b) is accomplished by valves comprising an integral assembly with each manifold.

13. The method of claim 11 wherein steps (b) and (c) are accomplished by inserting a separate test cartridge into each manifold.

* * * * *

UNITED STATES PATENT AND TRADEMARK OFFICE
CERTIFICATE OF CORRECTION

PATENT NO. : 4,702,105

DATED : 10/27/87

INVENTOR(S) : Raymont, Jr.

It is certified that error appears in the above-identified patent and that said Letters Patent is hereby corrected as shown below:

| COLUMN | LINE | DESCRIPTION |
|--------|------|-------------|
| 5 | 59 | delete "snubbe" insert --snubber-- |
| 5 | 56 | delete "sel" insert -- self -- |

Signed and Sealed this

First Day of November, 1988

Attest:

DONALD J. QUIGG

Attesting Officer

Commissioner of Patents and Trademarks